US008607249B2

(12) United States Patent
Otenko

(10) Patent No.: US 8,607,249 B2
(45) Date of Patent: Dec. 10, 2013

(54) SYSTEM AND METHOD FOR EFFICIENT CONCURRENT QUEUE IMPLEMENTATION

(75) Inventor: Oleksandr Otenko, Winnersh (GB)

(73) Assignee: Oracle International Corporation, Redwood City, CA (US)

( * ) Notice: Subject to any disclaimer, the term of this patent is extended or adjusted under 35 U.S.C. 154(b) by 111 days.

(21) Appl. No.: 13/241,003

(22) Filed: Sep. 22, 2011

(65) Prior Publication Data

US 2013/0081060 A1 Mar. 28, 2013

(51) Int. Cl.
*G06F 3/00* (2006.01)

(52) U.S. Cl.
USPC .......................................................... 719/314

(58) Field of Classification Search
None
See application file for complete search history.

(56) References Cited

U.S. PATENT DOCUMENTS

| 5,867,734 | A * | 2/1999 | Drews .............................. | 710/52 |
|---|---|---|---|---|
| 6,212,543 | B1 * | 4/2001 | Futral ............................ | 718/102 |
| 7,644,197 | B1 * | 1/2010 | Waldorf et al. ................. | 710/21 |
| 2003/0041185 | A1 * | 2/2003 | Creta et al. ........................ | 710/5 |
| 2005/0246186 | A1 * | 11/2005 | Nikolov ............................. | 705/1 |
| 2006/0123156 | A1 | 6/2006 | Moir et al. | |
| 2007/0074217 | A1 * | 3/2007 | Rakvic et al. .................. | 718/102 |
| 2007/0150586 | A1 * | 6/2007 | Kilian et al. ................... | 709/224 |
| 2008/0276025 | A1 * | 11/2008 | Cherem et al. ................. | 710/200 |
| 2010/0211954 | A1 | 8/2010 | Bauer et al. | |
| 2010/0299508 | A1 * | 11/2010 | Luttrell .......................... | 712/234 |

OTHER PUBLICATIONS

Maged Michael and Michael Scott, "Simple, fast, and practical non-blocking and blocking concurrent queue algorithms," Jan. 30, 2008, 3 pages downloaded at http://www.cs.rochester.edu/research/synchronization/pseudocode/queues.html.
Maged Michael and Michael Scott, Simple, fast, and practical non-blocking and blocking concurrent queue algorithms, ACM PODC 1996, 9 pages.
Y. Afek, G. Korland, and E. Yanovsky, "Quasi-linearizability: Relaxed consistency for improved concurrency," Tel-Aviv University, Aug. 2011, 45 pages.
A. Gottlieb, B. D. Lubachevsky, and L. Rudolph, "Basic techniques for the efficient coordination of very large numbers of cooperating sequential processors," ACM, This report (minus sections 2.3, 8, and 9) appeared in the Apr. 1983, issue of TOPLAS, Apr. 1983, 37 pages.
D. Hendler, I. Incze, N. Shavit, and M. Tzafrir, "Flat combining and the synchronization-parallelism tradeoff," ACM Jun. 13-15, 2010, 10 pages.
D. Hendler, I. Incze, N. Shavit, and M. Tzafrir, Scalable flat-combining based synchronous queues, In Distributed Computing. 2010, 15 pages.

(Continued)

*Primary Examiner* — H S Sough
*Assistant Examiner* — Carina Yun
(74) *Attorney, Agent, or Firm* — Robert C. Kowert; Meyertons, Hood, Kivlin, Kowert & Goetzel, P.C.

(57) ABSTRACT

A method, system, and medium are disclosed for facilitating communication between multiple concurrent threads of execution using an efficient concurrent queue. The efficient concurrent queue provides an insert function usable by producer threads to insert messages concurrently. The queue also includes a consume function usable by consumer threads to read the messages from the queue concurrently. The consume function is configured to guarantee a per-producer ordering, such that, for any producer, messages inserted by the producer are read only once and in the order in which the producer inserted those messages.

17 Claims, 5 Drawing Sheets

(56) References Cited

OTHER PUBLICATIONS

J. M. Mellor-Crummey, Concurrent queues: Practical fetch-and-Φ algorithms, 1987, University of Rochester Computer Science Technical Report # 229, 31 pages.

W. N. Scherer, III, D. Lea, and M. L. Scott, "Scalable synchronous queues," Communications of the ACM, vol. 52, No. 5, May 2009, 9 pages.

Y. Afek, G. Korland, M. Natanzon, and N. Shavit, "Scalable producer-consumer pools based on elimination-diffraction trees," P.D'Ambra, M., Guarracino and D. Talia (Eds.): Euro-Par 2010, Part II, LNCS 6272, pp. 151-162, 2010 Springer-Verlag Berlin Heidelberg.

U.S. Appl. No. 13/241,015, filed Sep. 22, 2011, Oracle America, Inc., all pages.

* cited by examiner

SYSTEM AND METHOD FOR EFFICIENT CONCURRENT QUEUE IMPLEMENTATION

BACKGROUND

A relationship that often arises between components of a software system is the producer/consumer pattern. In such a pattern, a group of one or more producers need to communicate messages or other data to a group of one or more consumers. For convenience, the consumed items are referred to herein generally as "messages," but may include objects, data structures, strings, and/or any other data that a producer can communicate to a consumer.

Communication between producers and consumers is sometimes implemented using a queue data structure. The queue effectively decouples the production and consumption activities by enabling a producer to insert a message into the queue and a consumer to independently retrieve that message later.

In concurrent systems, where different threads concurrently perform the production and consumption activities, a thread-safe, concurrent queue may be used. A concurrent queue allows thread-safe access by using producer and consumer locks to coordinate access by producers and by consumers.

The capability of a concurrent queue to decouple production and consumption activity offers various design advantages. For example, because the concurrent queue enables asynchronous communication between the producer and consumer, a producing thread may leave a message in the queue and perform other tasks rather than wait on a consuming thread to retrieve the message. Thus, activity between the two threads need not be tightly coordinated. Moreover, additional consumption or production threads may be added or removed without the need to modify the other threads.

SUMMARY

A method, system, and medium are disclosed for facilitating communication between multiple concurrent threads of execution using an efficient concurrent queue. The efficient concurrent queue provides an insert function usable by producer threads to insert messages concurrently. The queue also includes a consume function usable by consumer threads to read the messages from the queue concurrently. The consume function is configured to guarantee a per-producer ordering, such that, for any producer, messages inserted by the producer are read only once and in the order in which the producer inserted those messages. In some embodiments, the consume function may automatically remove the read message from the queue.

In some embodiments, the queue is configured to store the messages in an element array. The different cells of the element array may be concurrently accessible by different threads. However, the queue may control concurrency by associating a respective instance of a concurrency control mechanism with each cell, such that at most one thread can access a given cell at a given time.

The concurrency control mechanism may include an insert sequencer and a consume sequencer that the insert and consume functions are configured to manipulate. For example, executing the insert function may include determining an index into the element array and an insert ticket number for the insert sequencer, where the index and ticket number are based on the number of times the insert operation has been invoked (e.g., the concurrent queue may keep a counter that is atomically incremented each time the insert function is executed). The insert function may then make the thread wait the ticket number on the insert sequencer associated with the index. After awaiting, the thread may insert a message into the element array at the determined index and then advance the consume sequencer instance associated with the index. A consumer thread may then read the message by executing the consume function. In some embodiments, executing the consume function may comprise determining the index and a consume ticket number based on the number of times the consume function was invoked (e.g., using another atomically incremented counter), awaiting the consume ticket number of the consume sequencer associated with the index, then reading the message at the index, and finally, advancing the insert sequencer associated with the index.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

A concurrent queue is a data structure usable by one or more "producers" to send messages and/or other data to one or more "consumers" in an unsynchronized manner. For example, one or more producers may place messages into the concurrent queue and one or more consumers may asynchronously consume (i.e., remove/read) those messages.

Traditional concurrent queues have poor scaling behavior as the number of producers and consumers grow. The poor scaling performance is due to the high synchronization overhead of coordinating between the multiple threads.

Figure 1:
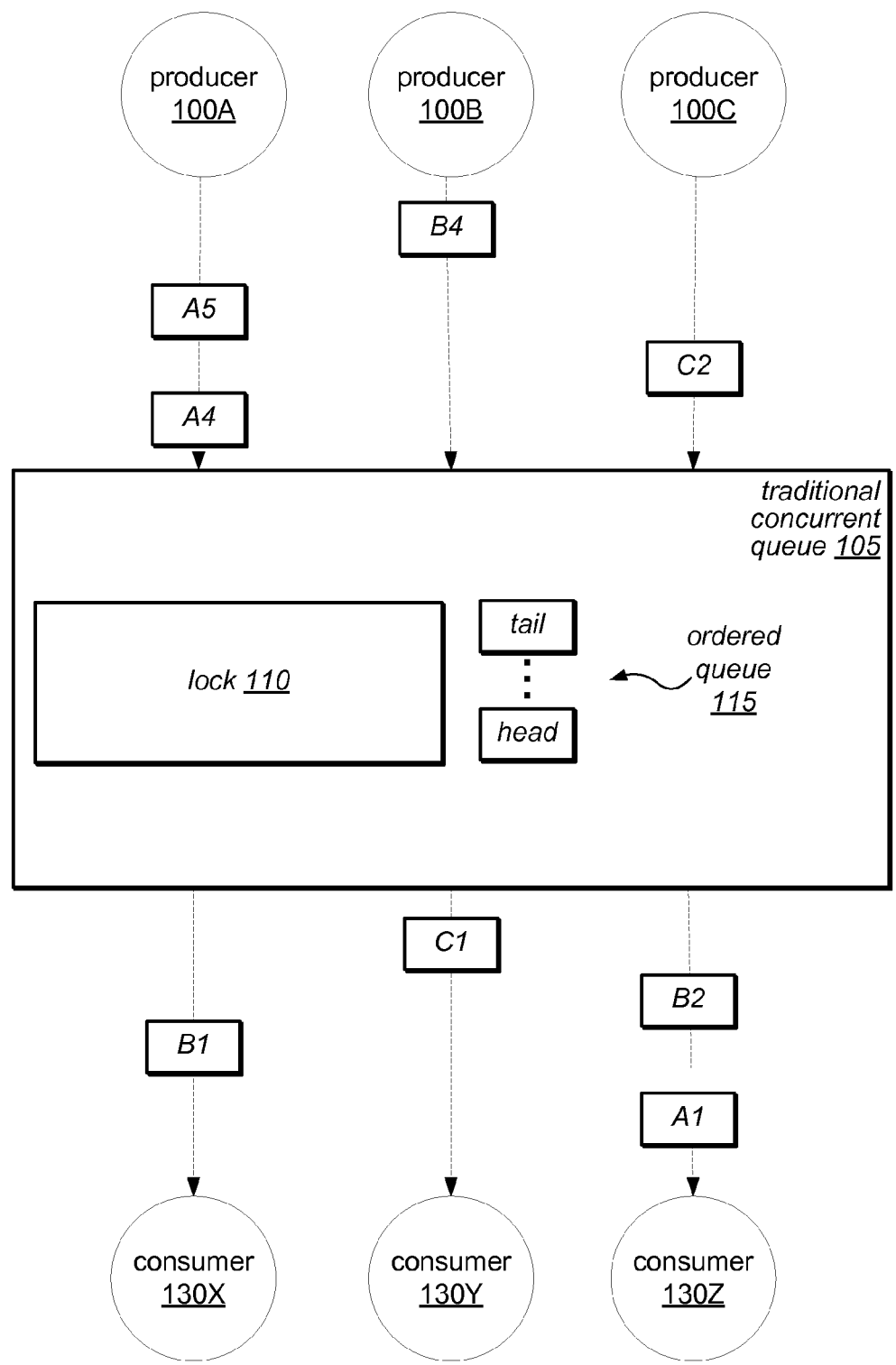
FIG. 1 is a block diagram illustrating the operation of a traditional concurrent queue coordinating communication between a group of producers and consumers.

FIG. 1 is a block diagram illustrating the operation of a traditional concurrent queue coordinating communication between a group of producers and consumers. The queue of FIG. 1 is a bounded blocking queue, which is one example of a traditional concurrent queue.

In FIG. 1, producers 100A-100C communicate with consumers 130X-130Z by placing messages into traditional concurrent queue 105. Time is represented in the vertical direction with later events being displayed higher on the figure. For example, consumer 130Z consumes A1, then consumer 130X consumes B1, then 130Z consumes B2, etc.

Traditional concurrent queues, such as 105, buffer messages in an ordered queue and utilize a single lock for the producers and consumers, such that only one producer or consumer can access the queue at a time. For example, concurrent queue 105 includes lock 110 for coordinating access to queue 115. To insert a message into queue 115, a producer must first acquire lock 110 exclusively of all other producers and consumers. If there is space in queue 115, the producer may then insert the message at the tail of the queue. Otherwise, the producer would wait until one of consumers 130 removes a message from the head of the queue, thereby creating space.

In traditional concurrent queues, such as 105, the lock 110 is a point of contention that can cause performance degradation as the number of threads increases. For example, as the number of producers using the queue increases, contention for lock 110 can quickly become a bottleneck. While one producer or consumer accesses the queue, all others are excluded. Moreover, the contention is detrimental to data cache effectiveness: each producer thread monitors the lock using a cache line, which must be invalidated each time the lock is acquired or released by any of the producers. For these reasons, traditional concurrent queue implementations result in significant thread contention and lead to poor system scalability.

Figure 2:
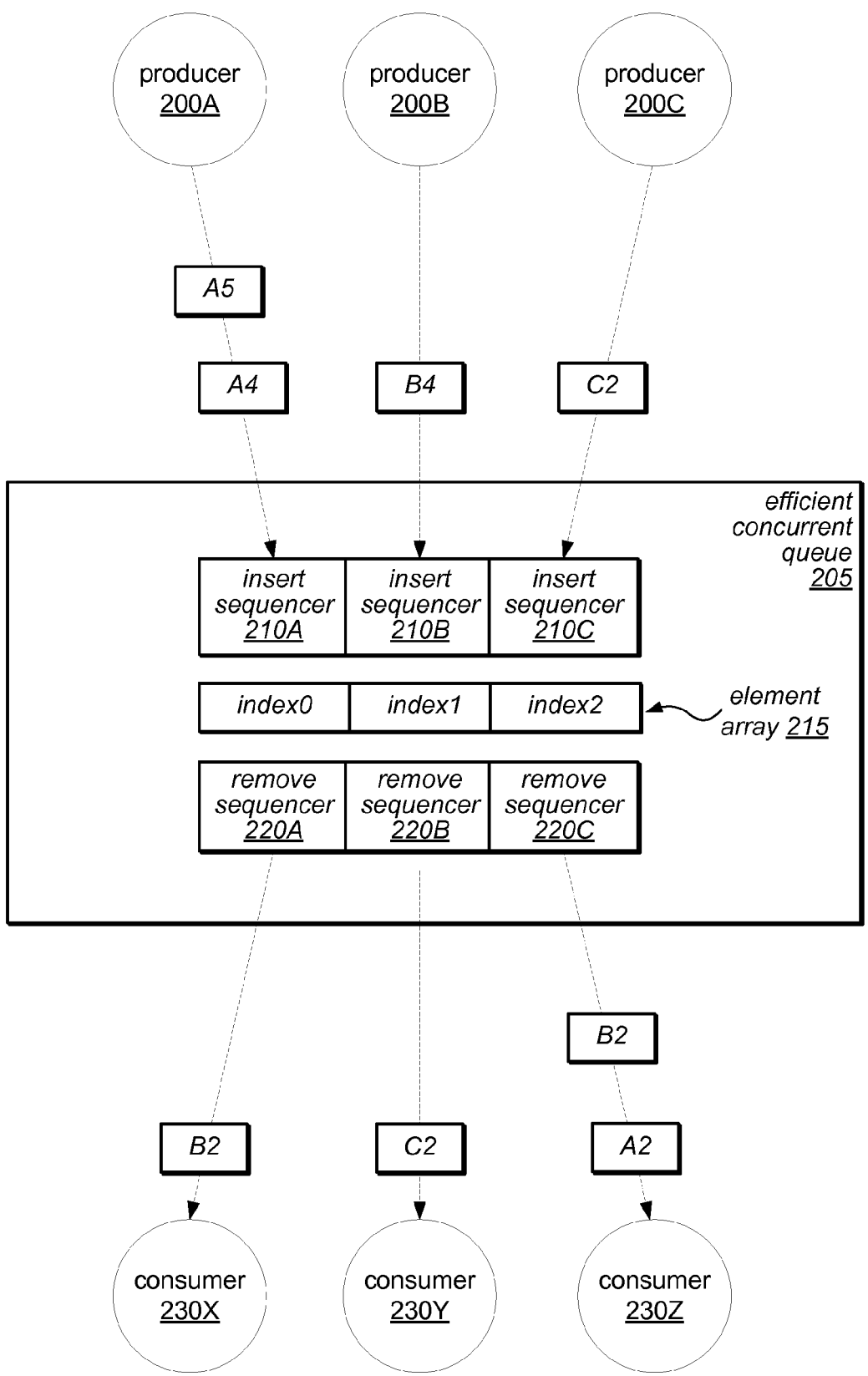
FIG. 2 is a block diagram illustrating the operation of a new, efficient concurrent queue, according to various embodiments.

FIG. 2 is a block diagram illustrating the operation of a new, efficient concurrent queue, according to various embodiments. As in FIG. 1, producers 200A-200C communicate with consumers 230X-230Z by placing messages into concurrent queue 205. As used herein, the term message may refer to any data, including data structures, strings, numbers, etc.

As in FIG. 1, time is represented in the vertical direction with later events being displayed lower on the figure. Unlike the traditional design of concurrent queue 105 in FIG. 1, the timeline depicted in FIG. 2 indicates that concurrent queue 205 enables multiple producers to insert messages into the queue concurrently and multiple consumers to retrieve those messages concurrently, while still preserving a strict FIFO ordering.

Concurrent queue 205 includes an element array 215. Element array 215 holds the queued elements, each in a respective index. Elements stored in element array 215 may be accessed by index.

For each index of element array 215, concurrent queue 205 includes a respective insert sequencer and a respective remove sequencer. Generally, a sequencer is a concurrent data structure usable to force one or more threads to wait and to release them in a specific order. For example, a sequencer may maintain a ticket number and when the ticket number increases, the sequencer releases any thread waiting on the new (or lower) ticket number. In some embodiments, a thread may "enter" such a sequencer by invoking a given "wait" function and specifying the event number upon whose arrival the thread is waiting. This event number may be referred to herein as a "ticket" and the thread awaiting that event may be referred to as waiting for the ticket.

Using the respective sequencers, concurrent queue 205 may effectively enqueue producers and/or consumers on a per-index basis. Such an implementation may reduce contention over concurrency control structures by allowing contenders to monitor different condition variables. For example, in the illustrated embodiment, because access to index0 and index1 is controlled by insert sequencers 210A and 210B respectively, producers 200A and 200B may insert messages A4 and B4 into those indices concurrently. Here, inserting concurrently refers to the fact that two producers can concurrently access the same array data structure and write respective messages into respective cells of the array. This is enabled because concurrency control is on a per-cell level rather than on a whole data structure level (i.e., read and write locks on the entire element array, as in FIG. 1).

Like producers 200, consumers 230 may also take advantage of the per-cell concurrency control by reading and/or removing messages from the element array concurrently. For example, consumer 230X may read message B2 from index 0 at the same time as consumer 230Y reads message C2 from index 1.

Although the per-cell concurrency control mechanisms enable concurrent insert and remove operations, the sequencers guarantee that messages from each producer are read in the order in which they were inserted. The remainder of this disclosure describes in detail, how to implement and configure concurrent queue 205 and its components, according to some embodiments.

The following pseudo-code demonstrates one possible implementation of a concurrent queue that uses sequencers:

```
class ConcurrentQueue< E >
{
    Sequencer [ ] removeSequencers = ...
    Sequencer [ ] insertSequencers = ...
    E [ ] elementArray = ...
    AtomicLong removeCounter = new AtomicLong( 0 );
    AtomicLong insertCounter = new AtomicLong( 0 );
    /** blocking put */
    public void put( E element )
    {
        long counter = insertCounter.getAndIncrement( );
        int index = counter % elementArray.length;
        int ticket = counter / elementArray.length;
        insertSequencers[ index ].await( ticket );
        elementArray[ index ] = element;
        removeSequencers[ index ].advance( );
    }
    /** blocking get */
    public E take( )
    {
        long counter = removeCounter.getAndIncrement( );
        int index = counter % elementArray.length;
        int ticket = counter / elementArray.length;
        removeSequencers[ index ].await( ticket + 1 );
        E element = elementArray[ index ];
        elementArray[ index ] = null;
        insertSequencers[ index ].advance( );
        return element;
    }
}
```

The pseudo-code above defines a ConcurrentQueue class that corresponds to concurrent queue 205. The ConcurrentQueue defines two arrays of sequencers (insertSequencers and removeSequencers) corresponding to insert sequencers 210 and remove sequencers 220 respectively. The ConcurrentQueue also defines an array elementArray for holding the message elements. Array elementArray may correspond to element array 215. The concurrent queue also keeps running counts of the total number of insert and remove operations that have been performed on the array (insertCounter and removeCounter respectively).

Figure 3:
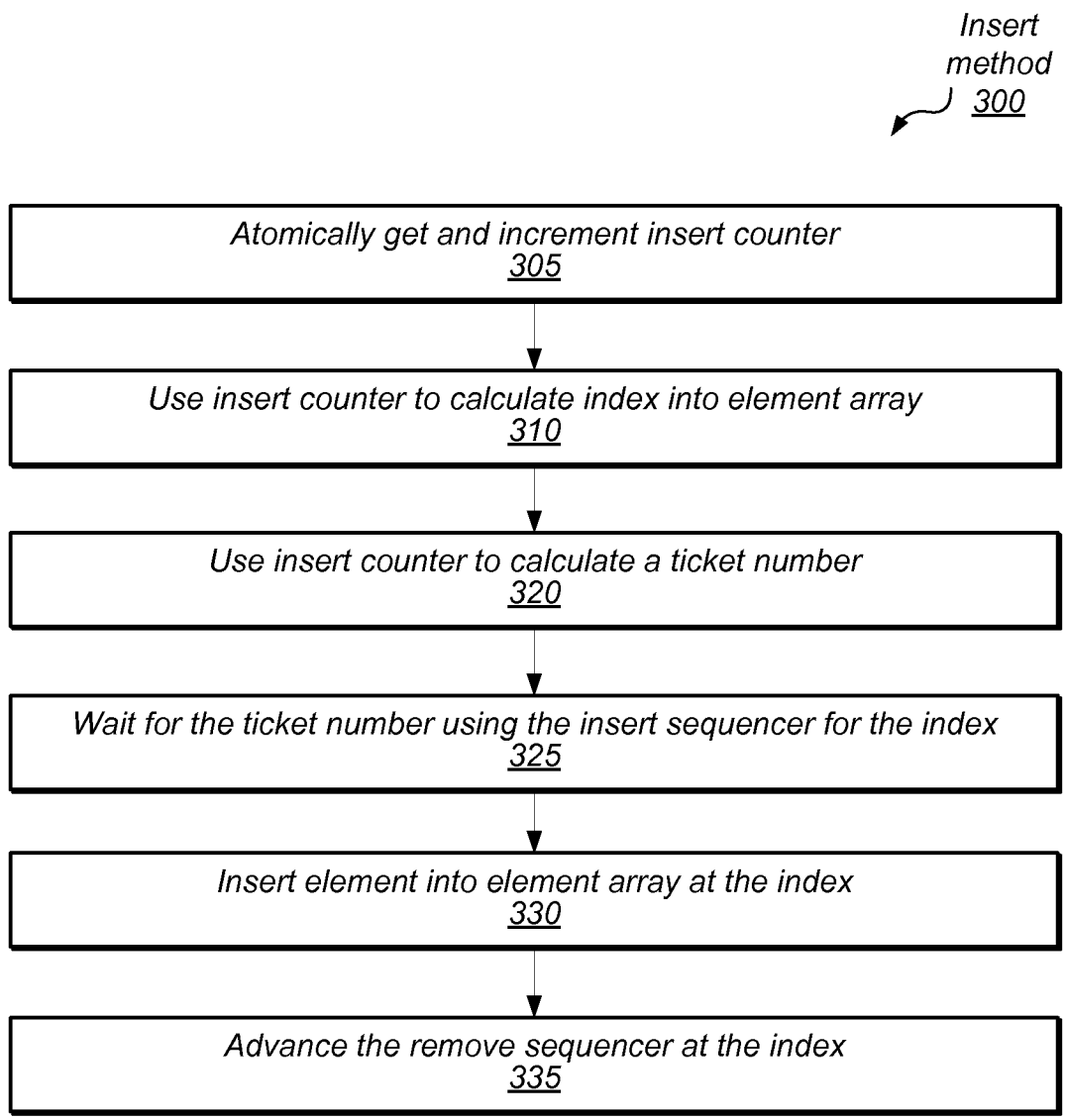
FIG. 3 is a flow diagram illustrating a method for inserting a new element into the concurrent queue, according to some embodiments.

FIG. 3 is a flow diagram illustrating a method for inserting a new element into the concurrent queue, according to some embodiments. Insert method 300 may correspond to the put( ) method of the ConcurrentQueue class above.

Insert method 300 begins by incrementing the insert counter (e.g., insertCounter) using an atomic get and increment operation (e.g., getAndIncrement( )), as in 305. The atomic operation reads the current value of the insert counter, stores the incremented value, and returns the value of the insert counter before the increment. The read, increment and store functions are performed together as an atomic (thread-safe) operation. That is, the method may guarantee that no other thread reads partial results from the operation or modifies the insert counter while the getAndIncrement operation is executing. More specifically, in this setting there is a guarantee that no other thread reads or stores the same value of the insert counter until the counter overflows. The counter may be chosen arbitrarily large to satisfy this condition for the lifetime of the computer application.

The insert method then uses the new value of the insert counter to calculate an index into the element array, as in 310. For example, in the pseudo-code above, the put method maps the new value of the insert counter to an array index of the element array by performing a modulo operation of the insert counter using the element array length.

The insert method then uses the insert counter to calculate a ticket number, as in 320. The ticket number will be used to sequence this thread in the insert sequencer corresponding to the array index. In the pseudo-code embodiment, the ticket number is calculated by dividing the insert counter by the length of the element array. Thus, an insert operation that maps to index N will always have a ticket number that is greater than the previous insert request that mapped to that same index N.

In 325, the thread waits on the ticket number using the insert sequencer at the calculated index. For example, in the pseudo-code embodiment, this is accomplished by invoking the await(ticket) method on the sequencer insertSequencers [index]. A precise implementation of the await method is described below. However, in general terms, the await(ticket) invocation makes the thread wait and does not release it until all other threads that entered the sequencer with a lower ticket number have been released.

After the thread has been released from the sequencer, the thread may insert an element into the element array at the calculated index, as in 330. In the pseudo-code example, this is accomplished by the elementArray[index]=element operation.

Finally, the thread advances the remove sequencer at the given index, as in 335. Generally, advancing the sequencer refers to increasing the index maintained by the sequencer for deciding when to release threads (e.g., incrementing the sequencer's ticket number). Particular steps for advancing the sequencer, according to some embodiments, are described in more detail below.

Figure 4:
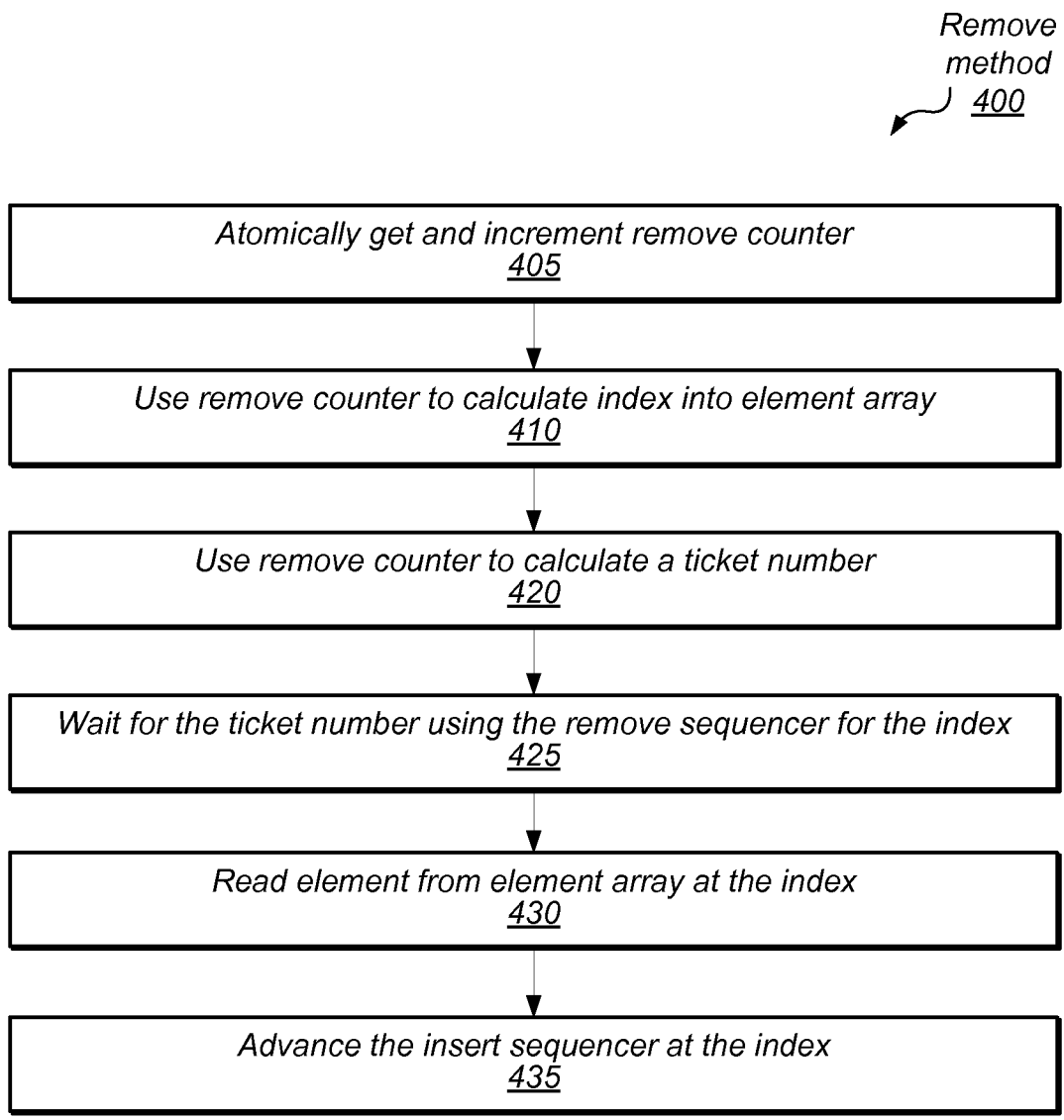
FIG. 4 is a flow diagram illustrating a method for reading/removing an element from the concurrent queue, according to some embodiments.

FIG. 4 is a flow diagram illustrating a method for reading/removing an element from the concurrent queue, according to some embodiments. Remove method 300 may correspond to the take( ) method of the ConcurrentQueue class defined in the pseudocode above.

Remove method 400 begins by incrementing the remove counter (e.g., removeCounter) using an atomic get and increment operation, as in 405. The atomic get and increment operation may have the same atomic properties as the atomic get and increment operation used to increment the insert counter in 305 of method 300.

The remove method then uses the new value of the remove counter to calculate an index into the element array, as in 410. The remove method may calculate this index in the same way as the insert method (i.e., by performing a modulo operation of the remove counter using the element array length).

Remove method 400 then uses the remove counter to calculate a ticket number, as in 420. The ticket number determined in 420 may be used to sequence this thread in the remove sequencer corresponding to the array index. The ticket number may be calculated by dividing the remove counter by the length of the element array, as was done with the insert counter in 320. Thus, a remove operation that maps to index N will always have a ticket number that is greater than the previous insert operation that mapped to that same index N.

In 425, the thread waits on the ticket number using the remove sequencer at the calculated index. The thread may accomplish this by invoking the await( ) method of the appropriate remove sequencer.

After the thread has been released from the release sequencer, the thread may read the element from the element array at the calculated index, as in 430. After reading the element, the thread may delete the element by setting the array index to null or by performing another operation indicating the data at the array index may be overwritten and/or ensuring the queue does not impede garbage collection of the objects removed from it.

In 440, the thread advances the insert sequencer corresponding to the given index. For example, a remove operation that targeted index 0 in FIG. 2 will advance insert sequencer 210A.

The pseudo-code below illustrates one example of a sequencer implementation. Different implementations of a sequencer are known in the art and the following sequencer definition is only one example:

```
class Sequencer
{
  AtomicLong ticket = new AtomicLong( 0 );
  // a queue of waiters with the waiting Thread and the ticket it is waiting
  for volatile QNode head = new QNode( null, 0 );
  // unblocks the passage of holders of any ticket below the current value
  public long advance( )
  {
    long ticket = ticket.incrementAndGet( );
    release( ticket );
    return ticket;
  }
  // blocks caller until ticket with provided number is issued by advance( )
  public void await( long ticket )
  {
    long t = ticket.get( );
    if ( ticket <= t ) return;
    enqueue( new QNode( Thread.currentThread( ), ticket ) );
    for(;;)
    {
      if ( ticket <= ticket.get( ) )
      {
        release( ticket );
        return;
      }
      delay( );
    }
  }
  // enqueues a QNode into the queue of waiters/
  private void enqueue( QNode e ) ...
  // removes waiters with the ticket below given value and resumes them
  private void release( long ticket ) ...
  // introduces a delay or suspends the thread
  private void delay( ) ...
}
```

Different implementations of a sequencer may be used. In various embodiments, a sequencer implementation may be any object that implements an await( ) (or similar) function that makes an invoking thread wait until a given condition is met and an advance( ) (or similar) function that advances system state towards meeting that condition.

A queue guarantees FIFO order, which defines a total order of messages placed in the queue. FIFO order is conventionally achieved (e.g., in queue 105) by ensuring that at most one producer is adding a message to the queue, and at most one consumer is removing a message from the queue. This condition is achieved through exclusive locks for producers and consumers. The time of acquire of the producer lock defines the time of adding the message to the queue. Combined with the condition that at most one producer is adding a message at any given time, even when the lock is contended by many, the total order of messages is determined by the time of acquiring the producer lock. Similar reasoning can be applied to understand the order of visibility of the messages by the consumers.

Turning now to the efficient concurrent queue (e.g., 205), if the queue were backed by an infinite-size array, each message could be stored in its individual index corresponding to the total order of the producer. However, element array 215 is finite, so the same indices are reused. Therefore, the efficient concurrent queue may ensure ordered access to the indices as follows:

In the proposed solution the total order of messages is defined by the insertCounter variable. Because this counter is atomically incremented by each producer, it is unique for every message. It is the direct representation of the total order of messages. The sequencers associated with each index ensure that each consumer does not proceed until the message it wants to read has been stored. Similarly, each producer does not proceed until the previous message has been read from the index. The use of multiple sequencers permits multiple producers and multiple consumers to proceed concurrently.

More formally, if message M1 is guaranteed to appear in the queue before message M2 (through external synchronization of producers P1 and P2 or through program order of execution of a single producer), then the producers P1 and P2 writing these messages will correspond to insertCounter values W1 and W2 respectively, such that W1<W2. If the producers are able to obtain insertCounter values such that W1>W2, then the producers were able to arrive at the method computing the value of W1 and W2 in a different order; therefore, the same ordering would be observed in a lock-based FIFO queue, too, as that would mean the producers would be able to take the lock in reverse order and store message M2 before M1.

Similar reasoning can be applied to prove the order in which the consumers are going to retrieve messages from the queue. Therefore, both in the traditional lock-based queue and in the new efficient concurrent queue, strict ordering of messages can be guaranteed for messages from the same producer in absence of external synchronization between producers or consumers. Because there is no timing constraint in the above reasoning, the producers and consumers can proceed concurrently without blocking each other, unless they are attempting to access the same underlying array index.

To guarantee the order of message stores that the producers can execute to the same index, the efficient concurrent queue uses the total order of producers as a whole to arrive at the total order of producers to the individual cell. A sequencer is used to enforce this order in the above example embodiment, but in other embodiments, a ticket-lock may be used instead.

As described above, the next element array index is chosen in a round-robin fashion by using the least-significant bits of the insertCounter, W, by computing the remainder of dividing W by the array length L, c=W mod L. This is a cheap way to spread access to the cells evenly, thus reducing contention on individual array cells. Given the choice of the function to compute the array cell number, producers P1 and P2 may write to the same array index of the array with length L, if W1=W2 (mod L), or, equivalently, the remainders of dividing W1 and W2 by L, are equal: c1=c2.

In the example embodiment, the order of insert operations to the same array index is determined by the absolute value of W1 and W2, which can also be determined using w1=$\lfloor W1/L \rfloor$ and w2=$\lfloor W2/L \rfloor$ where $\lfloor x \rfloor$ is "floor" of x (i.e., the biggest integer not greater than x). Therefore, w1<w2 if and only if W1<W2, and hence, the values of w1 and w2 can be used to determine the order of stores to the same cell, and is, in fact, the value used as the "ticket" in the example embodiment.

The use of the reduction function to produce values w1 and w2 enables the system to build more complex hierarchically distributed efficient concurrent queues, suitable for use with hierarchically distributed memories, including NUMA systems or clusters of such systems. A benefit of such hierarchical distribution is that each memory in the hierarchy may store data completely disjoint from the other memories and therefore may not require coherence traffic to maintain consistency of the efficient concurrent queue.

If the length of the underlying array is chosen to be a power of 2 (i.e., L=$2^p$), the remainder computation c=W mod L, and the computation of w=$\lfloor W/L \rfloor$ may be reduced to highly efficient bit operations that may be readily available on most hardware platforms. In Java, for example, such a bit operation may be expressed as: c=W&(L−1); w=W>>p.

As previously discussed, the sequencer described in the pseudo-code above is only one implementation of a sequencer that can be used to implement insert sequencers 210 or remove sequencers 220. However, other implementations are possible.

Figure 5:
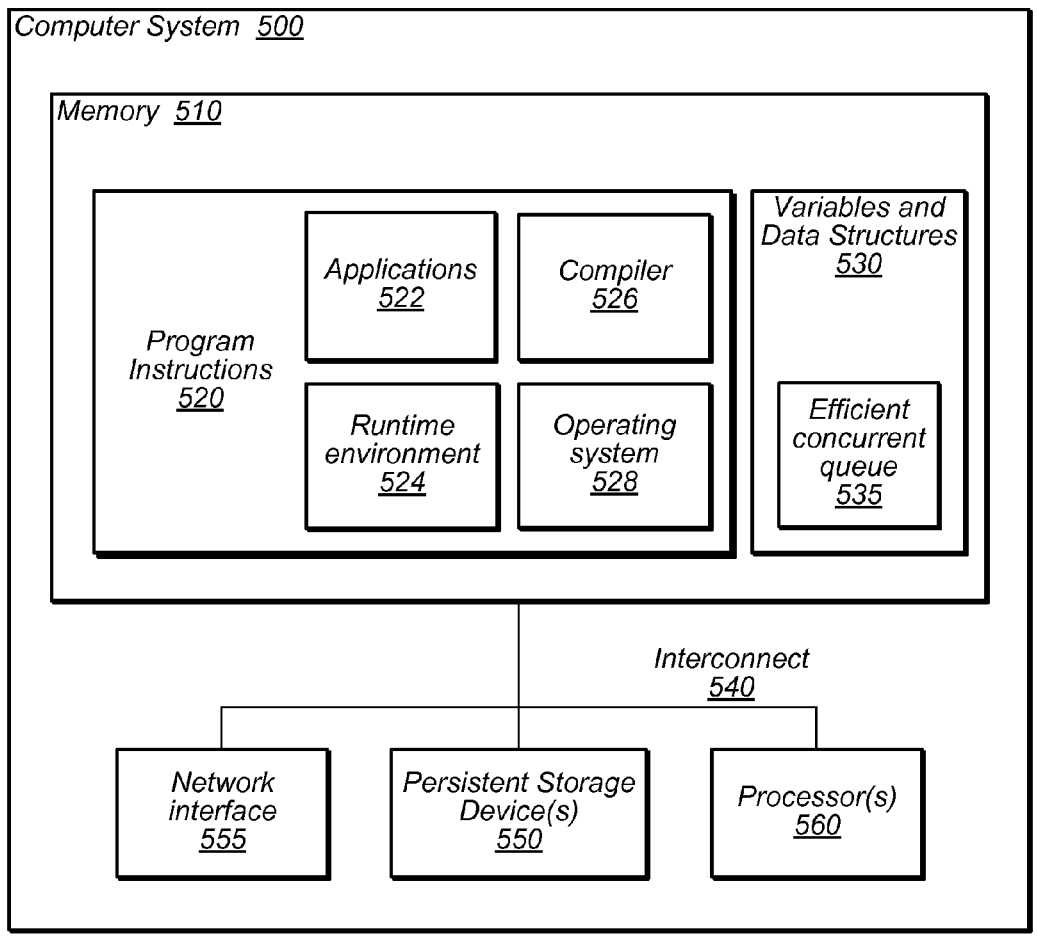
FIG. 5 is a block diagram illustrating a computer system configured to implement efficient concurrent queues, according to various embodiments.

FIG. 5 is a block diagram illustrating a computer system configured to implement efficient concurrent queues, according to various embodiments. The computer system 500 may correspond to any of various types of devices including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The code to execute various methods described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 500 includes various interconnected components. For example, system 500 includes one or more processors 560, each of which may include multiple cores, any of which may be single or multi-threaded. The computer system may include one or more persistent storage devices, such as 550, which may include optical storage, magnetic storage, hard drive, tape drive, and/or solid-state memory, etc. The system may also include a network interface, such as 545, which may facilitate communication with other computers across a network. The computer system may also include one or more memories, such as 510, which may be implemented as one or more of cache, SRAM, DRAM, RDRAM, EDO RAM, DDR RAM, SDRAM, Rambus RAM, EEPROM, etc. Various embodiments may include fewer or additional components not illustrated in FIG. 5 (e.g., video cards, audio cards, additional network interfaces, peripheral devices, a network interface such as an ATM interface, an Ethernet interface, a Frame Relay interface, monitors, keyboards, speakers, etc.).

According to the illustrated embodiment, the network interface 545, persistent storage device 550, one or more processors 560, and memory 510 may be interconnected via interconnect 540. Interconnect 540 may be implemented using various technologies. For example, interconnect 540 may correspond to one or more system buses and/or to one or more point-to-point interconnects in different topologies (e.g., grid, torus, etc.).

One or more of the system memories 510 may contain program instructions 520. Program instructions 520 may be encoded in platform native binary, any interpreted language such as Java™ byte-code, in any high-level programming language such as C/C++, Java™, etc., or in any combination thereof Program instructions 520 may include instructions executable to implement various applications 522, runtime environments 524 (e.g., Java™ runtime and associated libraries), compilers 526, and/or operating systems 528.

In some embodiments, memory 510 may include any number of in-memory variables and/or data structures, such as 530. Variables and data structures may comprise any number of variables and/or data structures allocated by executing programs, such as by applications 522, server 528, compiler 526, and runtime environments 524.

Variables and data structures 530 may include various sequencers (e.g., 210, 220), arrays (e.g., 215), and/or other data structures. For example, variables and data structures 530 includes efficient concurrent queue 535, which may correspond to efficient concurrent queue 205 in FIG. 2.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A computer-implemented method of facilitating communication between multiple concurrent threads of execution, the method comprising:
   a computer executing the threads concurrently, wherein the threads comprise a plurality of producer threads and a plurality of consumer threads;
   the computer providing the multiple concurrent threads with access to an efficient queue, wherein the providing includes:
      providing an insert function usable by the producer threads to insert messages into the efficient queue concurrently through invocations of the insert function; and
      providing a consume function usable by the consumer threads to read the messages from the efficient queue concurrently, wherein for each of the producers, the consume function is configured to guarantee that messages inserted by the producer are read in the order in which the producer inserted those messages and that each message is read at most once; and
   the producer threads using the efficient queue to exchange messages with the consumer threads by: the producer threads inserting messages into the efficient queue by executing the insert function and the consumer threads reading the messages by executing the consume function;
   wherein the queue is configured to store the messages in an element array, and wherein different cells of the element array are concurrently accessible by the multiple concurrent threads of execution;
   wherein executing the insert function comprises determining an index into the element array and an insert ticket number, wherein the index and insert ticket number are calculated dependent on the number of times the insert function has been invoked; and
   wherein the producer threads insert the messages in an order determined by the index and the insert ticket number.

2. The method of claim 1, wherein executing the consume function comprises reading a message from the efficient queue and removing the message from the efficient queue.

3. The method of claim 1, further comprising: associating a respective instance of a concurrency control mechanism with each cell of the element array, wherein the instance of the concurrency control mechanism ensures that at most one thread can access the cell at a given time.

4. The method of claim 3, wherein the concurrency control mechanism comprises an insert sequencer and a consume sequencer.

5. The method of claim 1, wherein executing the insert function comprises:
   awaiting the insert ticket number on an insert sequencer instance associated with the index;
   after the awaiting, inserting a message into the element array at the index; and
   after the inserting, advancing a consume sequencer instance associated with the index.

6. The method of claim 5, wherein executing the consume function comprises:
   determining the index and a consume ticket number, wherein the index and consume ticket number are calculated dependent on the number of times the consume function has been invoked by the consumer threads;
   awaiting the consume ticket number on a consume sequencer associated with the index;
   after the awaiting, reading the message at the index of the element array; and
   after the reading, advancing the insert sequencer associated with the index.

7. A non-transitory storage medium storing program instructions executable by a computer to implement:
   an efficient concurrent queue usable by a plurality of concurrent producer threads to exchange messages with a plurality of concurrent consumer threads, wherein the efficient concurrent queue includes:
      an insert function concurrently executable by the producer threads to insert messages into the queue; and
      a consume function concurrently executable by the consumer threads to read the messages from the queue;
      wherein for each of the messages, the efficient concurrent queue is configured to:

retain the message at least until one of the consumer threads reads the message by executing the consume function; and guarantee that the message is read by the consumers: (1) at most once, (2) only after all other messages inserted previously by the same producer are read, and (3) before any other message inserted subsequently by the same producer is read;

wherein the queue is configured to store the inserted messages in respective cells of an element array, wherein the cells are concurrently accessible by the producer and consumer threads;

wherein the insert function comprises program instructions executable to insert a message by determining an index into the element array and an insert ticket number, wherein the index and insert ticket number are calculated dependent on the number of times the insert function has been invoked; and wherein the producer threads insert the messages in an order determined by the index and the insert ticket number.

8. The medium of claim 7, wherein executing the consume function comprises reading one of the messages and removing the message from the queue.

9. The medium of claim 7, wherein the program instructions are further executable to associate a respective instance of a concurrency control mechanism with each cell of the element array, wherein the instance of the concurrency control mechanism ensures that at most one thread can access the cell at a given time.

10. The medium of claim 9, wherein the concurrency control mechanism comprises an insert sequencer and a consume sequencer.

11. The medium of claim 7 wherein the insert function comprises program instructions executable to insert a message by:

awaiting the insert ticket number on an insert sequencer instance associated with the index;

after the awaiting, inserting the message into the element array at the index; and after the inserting, advancing a consume sequencer instance associated with the index.

12. The medium of claim 11, wherein the consume function comprises program instructions executable to consume the message by:

determining the index and a consume ticket number, wherein the index and consume ticket number are calculated dependent on the number of times the consume function has been invoked;

awaiting the consume ticket number on a consume sequencer instance associated with the index;

after the awaiting, reading the message at the index of the element array; and after the reading, advancing the insert sequencer instance associated with the index.

13. An apparatus, comprising:

a processor;

memory coupled to the processor and storing program instructions executable by the processor to implement:

a plurality of producer threads configured to pass messages to a plurality of consumer threads using an efficient concurrent queue, wherein the efficient concurrency queue includes:

an insert function concurrently executable by the producer threads to insert messages into the queue; and a consume function concurrently executable by the consumer threads to read the messages from the queue;

wherein for each of the messages, the efficient concurrent queue is configured to:

retain the message at least until one of the consumer threads reads the message by executing the consume function; and guarantee that the message is read by the consumers: (1) at most once, (2) only after all other messages inserted previously by the same producer are read, and (3) before any other message inserted subsequently by the same producer is read;

wherein the queue is configured to store the inserted messages in respective cells of an element array, wherein the cells are concurrently accessible by the producer and consumer threads;

wherein the insert function is executable to insert a message by determining an index into the element array and an insert ticket number, wherein the index and insert ticket number are calculated dependent on the number of times the insert function has been invoked; and wherein the producer threads insert the messages in an order determined by the index and the insert ticket number.

14. The apparatus of claim 13, wherein executing the consume function comprises reading one of the messages and removing the message from the queue.

15. The medium of claim 13, wherein the program instructions are further executable to associate a respective instance of a concurrency control mechanism with each cell of the element array, wherein the instance of the concurrency control mechanism ensures that at most one thread can access the cell at a given time and the concurrency control mechanism comprises an insert sequencer and a consume sequencer.

16. The apparatus of claim 15 wherein the insert function comprises program instructions executable to insert a message by:

determining an index into the element array and an insert ticket number, wherein the index and insert ticket number are calculated dependent on the number of times the insert function has been invoked;

awaiting the insert ticket number on an insert sequencer instance associated with the index;

after the awaiting, inserting the message into the element array at the index; and after the inserting, advancing a consume sequencer instance associated with the index.

17. The apparatus of claim 16, wherein the consume function comprises program instructions executable to consume the message by:

determining the index and a consume ticket number, wherein the index and consume ticket number are calculated dependent on the number of times the consume function has been invoked;

awaiting the consume ticket number on a consume sequencer instance associated with the index;

after the awaiting, reading the message at the index of the element array; and after the reading, advancing the insert sequencer instance associated with the index.

* * * * *

UNITED STATES PATENT AND TRADEMARK OFFICE
CERTIFICATE OF CORRECTION

| | | |
|---|---|---|
| PATENT NO. | : 8,607,249 B2 | |
| APPLICATION NO. | : 13/241003 | |
| DATED | : December 10, 2013 | |
| INVENTOR(S) | : Otenko | |

It is certified that error appears in the above-identified patent and that said Letters Patent is hereby corrected as shown below:

In the Specification

In column 8, line 12, delete "w2=[W2/L]" and insert -- W2=[W2/L], --, therefor.

In column 9, line 31, delete "thereof" and insert -- thereof. --, therefor.

Signed and Sealed this
Fifteenth Day of July, 2014

Michelle K. Lee
*Deputy Director of the United States Patent and Trademark Office*